Figure 1:
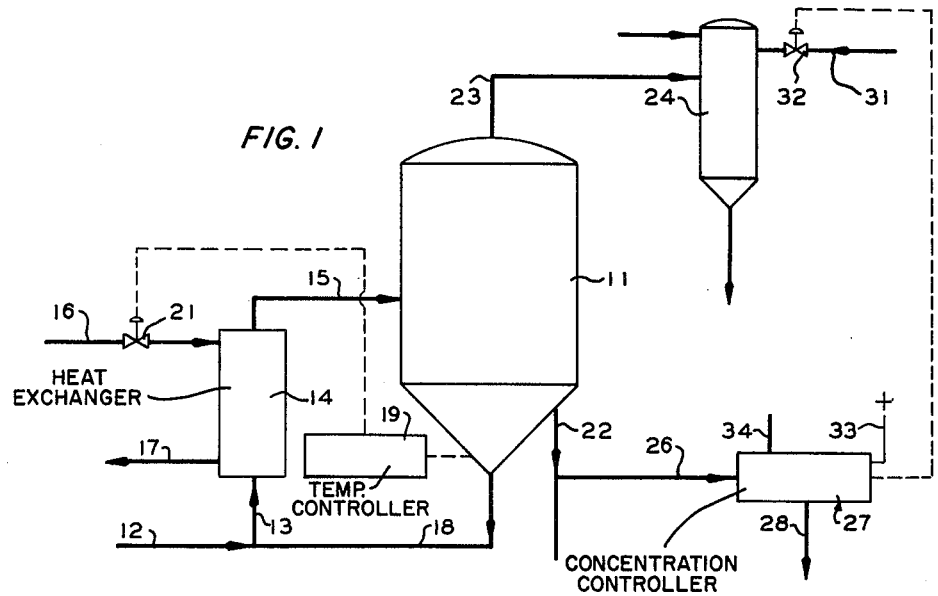

June 15, 1965  D. M. VESPER ETAL  3,188,857
METHOD AND APPARATUS FOR CONCENTRATION MEASUREMENT AND CONTROL
Filed Aug. 27, 1962  3 Sheets-Sheet 1

INVENTORS
D.M. VESPER
D.E. LUPFER
BY
ATTORNEYS

INVENTORS
D.M. VESPER
D.E. LUPFER

INVENTORS
D.M. VESPER
D.E. LUPFER

# United States Patent Office 3,188,857
Patented June 15, 1965

3,188,857
METHOD AND APPARATUS FOR CONCENTRATION MEASUREMENT AND CONTROL
Daniel M. Vesper and Dale E. Lupfer, Bartlesville, Okla., assignors to Phillips Petroleum Company, a corporation of Delaware
Filed Aug. 27, 1962, Ser. No. 219,607
4 Claims. (Cl. 73—53)

This invention relates to measurement and control. In one aspect the invention relates to temperature measurement. In another aspect the invention relates to cloud point measurement and control. In another aspect the invention relates to fudge point measurement and control. In another aspect the invention relates to light transmission measurement. In another aspect the invention relates to continuous control from an intermittent measurement.

In measurement and control operations there are many instances in which a desired value can be determined only at intervals, as for example when the quantity is being measured on intermittently obtained samples, but in which it is desirable or necessary that a continuous measurement or control value be maintained. An instance in which an intermittent measurement is utilized to provide a continuous measurement or control signal is in the determination of the cloud point temperature of a composition. A cloud point can be determined by obtaining a sample of the composition and cooling the composition while measuring the temperature and determining the temperature at which the light transmission of the sample changes a relatively large amount. This type of measurement is by its nature one which must be made intermittently and it is desirable to measure or control continuously from the last available measurement.

The determination of the cloud point is useful in determining and controlling the fudge point of ammonium nitrate solutions and, therefore, the concentration of the ammonium nitrate in the solution.

An object of our invention is to maintain a continuous measurement and control signal of a property which is determined intermittently.

Another object of our invention is to determine the cloud point of a composition and to maintain continuous values of the intermittently obtained cloud point.

Another object of our invention is to determine and control the fudge point of a product.

Another object of our invention is to determine and control the concentration of a product in solution.

Other aspects, objects, and the advantages of our invention are apparent in the written description, the drawing, and the claims.

According to our invention, an intermittently determined quantity is converted to an intermittently variable continuous quantity by producing a pneumatic signal having a pressure proportional to the measured quantity, applying the pneumatic signal to a volume chamber to bring the pressure of the volume to the value of the pressure of the pneumatic signal, and discontinuing the application of the pneumatic signal to the chamber while applying the pressure of the chamber to pressure-detecting means. Preferably, the chamber is disconnected from the pressure-detecting means while a new signal is being applied to it. Since the pressure-detecting circuit is shut in during this period, a continuous value, equal to the previously measured quantity, is continuously recorded or transmitted to a control instrument while the new value is being measured and applied to the volume chamber. When the volume chamber is again opened to the pressure-detecting system, the new value is applied thereto and the measurement or control signal altered accordingly. If the volume of the chamber is large as compared with the shut-in portion of the pressure-detecting system, the total pressure, when the two are opened together, is substantially equal to that of the volume chamber.

Apparatus according to our invention for detecting an intermittently measured quantity includes, in addition to means for measuring the quantity, means for producing a pneumatic signal having a pressure proportional to the quantity, a volume chamber, a conduit connecting the chamber with the means producing the pneumatic signal and means to close this conduit, pressure-detecting means, a conduit connecting the volume chamber with the pressure-detecting means, and means to close the latter conduit.

Further according to our invention, there is provided a method for determining the cloud point temperature of a composition by catching a sample of the composition, measuring the temperature of the sample while the sample is being cooled, producing a pneumatic signal having a pressure which is a function of the temperature, applying the pneumatic signal to a volume chamber to bring the pressure in the chamber to the value of the pressure of the pneumatic signal, passing a beam of light through the sample, producing an electrical signal which is a function of the light transmission of the sample and, when the electrical signal reaches a value indicative of the cloud point, discontinuing the application of the pneumatic signal to the chamber, applying the pressure of the chamber to a pressure-detecting system and dumping the sample. To control the concentration of a product in which the fudge point is a function of the concentration and the cloud point measures the fudge point, the concentration can be controlled according to our invention by controlling a variable of the process responsive to the value of the measured pressure.

In the above types of operation, the steps are repeated by discontinuing the application of pressure to the pressure-detecting means, opening the pneumatic signal to the chamber, and catching a new sample at a predetermined time interval to initiate another measuring sequence.

Figure 4:
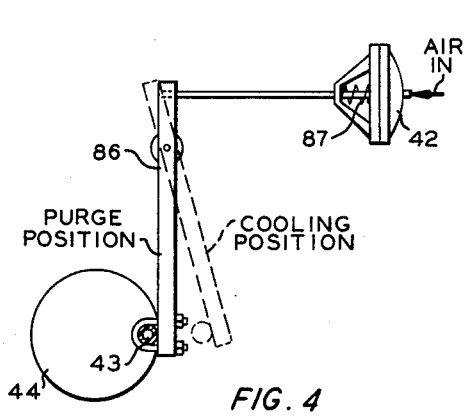
Figure 5:
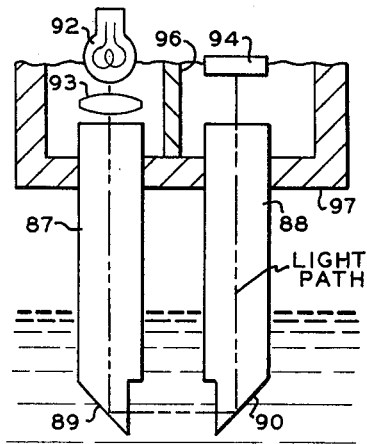
Figure 2:
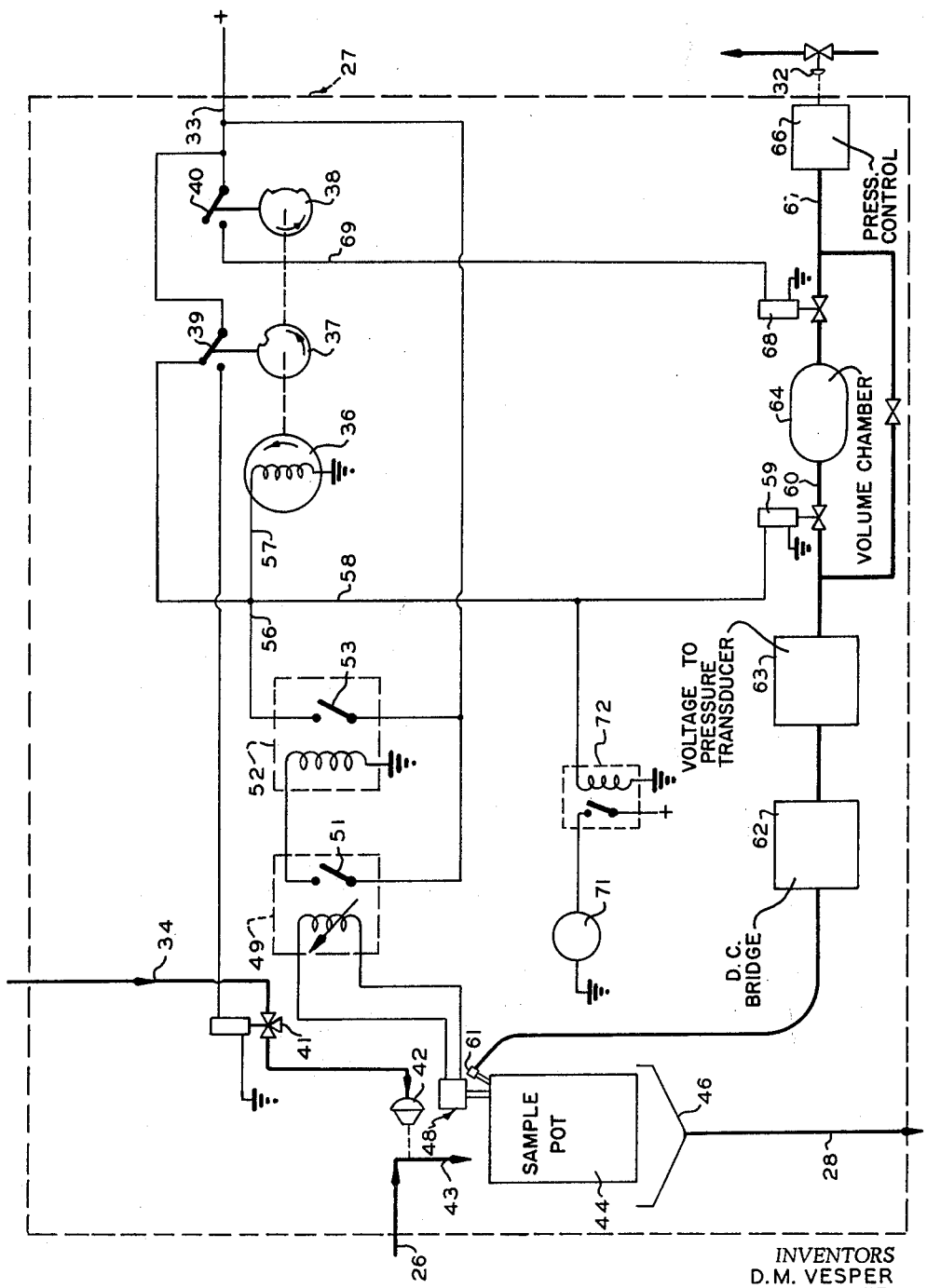
Figure 6:
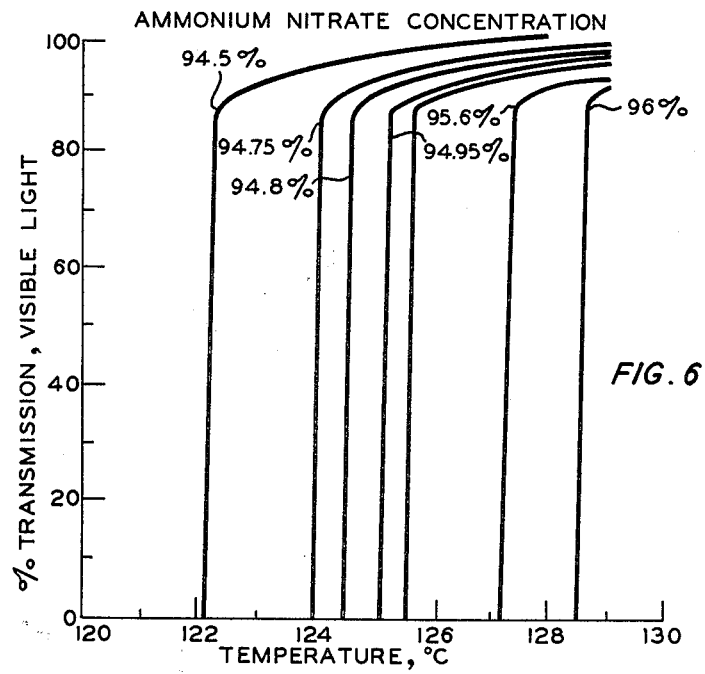
Figure 3:
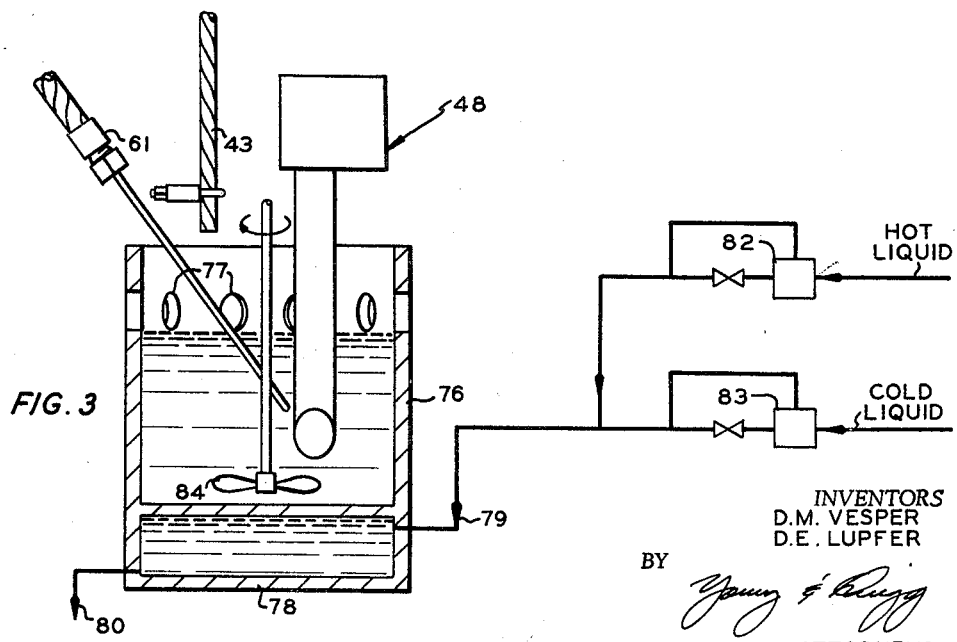

In the drawing:
FIGURE 1 illustrates an ammonium nitrate evaporator and associated control equipment.
FIGURE 2 is a diagrammatic representation of a concentration recorder-controller.
FIGURE 3 is a vertical cross section of a sample pot assembly, including measurement and sampling elements.
FIGURE 4 is a plan view of the apparatus of FIGURE 3 illustrating the operation of a sample catching and purging apparatus.
FIGURE 5 is a vertical cross section of an optical system suitable for use in the sample pot of FIGURE 2.
FIGURE 6 is a typical curve of light transmission versus temperature, illustrating the variation in light transmission at the fudge point temperature for ammonium nitrate.

In the apparatus of FIGURE 1, dilute ammonium nitrate solution is introduced into evaporator 11 through line 12, line 13, heat exchanger 14 and line 15. Steam is introduced into heat exchanger 14 through line 16 and steam or condensate is withdrawn therefrom through line 17. A positive circulation of ammonium nitrate solution is maintained in evaporator 11 by recycling a portion of the solution from evaporator 11 through line 18, line 13, heat exchanger 14 and line 15, the circulation being accomplished by thermosiphon effect and aiding in maintaining close control of the temperature in evaporator 11.

The temperature in evaporator 11 is controlled automatically by temperature recorder-controller 19 which operates motor valve 21 in line 16 in response to variations of temperature in evaporator 11 to regulate the amount of steam supplied to heat exchanger 14 and thereby control the temperature of the ammonium nitrate solution fed to evaporator 11. Where ammonium nitrate solutions are being concentrated for use in prilling operations, a temperature in the range of 130 to 140° C. at an absolute pressure in the range of 200 to 250 mm. Hg is preferred. Concentrated ammonium nitrate solution is withdrawn from evaporator 11 through line 22. Steam is withdrawn from evaporator 11 through line 23 and condensed in barometric condenser 24, thereby providing a reduced or subatmospheric pressure in evaporator 11.

Concentrated ammonium nitrate solution is withdrawn from line 22 through sample line 26, analyzed for concentration in concentration analyzer-controller 27 and removed therefrom through line 28. From line 28, the solution can be returned to the product stream.

Air enters barometric condenser 24 through line 31, the amount of air being regulated by motor valve 32 in response to variations in concentration of the ammonium nitrate solution as measured by concentration analyzer controller 27. If the concentration of the ammonium nitrate solution falls below the desired value, controller 27 actuates valve 32 to reduce the amount of air being bled into the system, thus reducing the pressure in evaporator 11. Since the evaporator is operated at substantially constant temperature, the pressure reduction increases the rate of evaporation of water from the ammonium nitrate solution. As the evaporation increases, the concentration of the product solution increases until the concentration, measured by controller 27, returns to the desired value. If the concentration rises above the selected value, recorder 27 actuates valve 32 to increase the flow of air in line 31, thereby increasing the pressure in the evaporator, decreasing the rate of evaporation of the water from the ammonium nitrate solution, and reducing the concentration of the product solution.

Controller 27 is illustrated schematically in FIGURE 2. A source of electrical energy is connected with controller 27 through conductor 33, and a source of air under pressure is connected through line 34. Timer motor 36 is provided to rotate cams 37 and 38. Cam 37 actuates switch 39 and cam 38 actuates switch 40. Solenoid valve 41 is provided in air line 34 to control the flow of air under pressure to diaphragm actuator 42. Actuator 42 controls the position of a movable inlet 43 connected with sample line 26 to position this inlet over sample pot 44 or sampling collecting funnel 46. Optical system 48 includes a photocell connected in series with photocell relay 49, the contacts 51 of which are connected in series with power relay 52. Contacts 53 of power relay 52 are connected through conductor 56 and conductor 57 with timer motor 36, and through conductor 58 and conductor 58 with solenoid valve 59 in line 60. A thermistor 61 is connected with a DC bridge 62, the output of which in turn is connected with a voltage-to-pressure transducer 63. The output of transducer 63 is connected through solenoid valve 59 with volume chamber 64, and volume chamber 64 in turn is connected with a pressure recorder-controller 66 through line 67, which is provided with solenoid valve 68. The output of controller 66 is connected with motor valve 32. A by-pass valve is provided as shown in parallel with valves 59 and 68 and chamber 64 to permit calibration of controller 66.

The solenoid of solenoid valve 68 is connected through switch 40 with conductor 33, through conductor 69. Relay 72, for the actuation of an alarm 71, such as a light or alarm bell, is connected with conductor 58.

Sample pot 44 is illustrated in more detail in FIGURE 3. It comprises a sample chamber 76 having overflow outlets 77, a coolant chamber 78, and coolant inlet and outlet 79 and 80. The temperature of the coolant is adjusted by adjusting flow controllers 82 and 83 to proportion the flow of hot liquid and cold liquid to obtain the desired temperature. An agitator 84 maintains the sample within chamber 76 well stirred.

The adjustment of movable inlet 43 is illustrated in FIGURE 4. When air is supplied to diaphragm actuator 42 a lever 86 is moved to the dotted position in which inlet 43 discharges outside chamber 76, directly into sample collecting funnel 46. When air is released from actuator 42, spring 87 moves lever 86 to the position illustrated in solid lines in FIGURE 4, in which position the discharge is directly into sample pot 44.

Optical system 48 is illustrated in more detail in FIGURE 5. This system comprises a pair of quartz rods 87 and 88, the lower ends of which are submerged below the sample level in sample chamber 76. The ends of these rods are ground and polished to provide reflecting surfaces 89 and 90. A light source 92 and a collimating lens 93 are positioned above the end of quartz rod 87, while photocell 94 is positioned above rod 88. A light barrier 96 separates light source 92 from direct communication with photocell 94. A housing 97 is provided to prevent access of the sample fluid with the light source and photocell sections of optical system 48.

To prevent solidification of the sampled fluid in the sampling lines, the sample lines are left open for continuous flow. Preferably the lines are steam jacketed and insulated. While the sample stream is flowing into sample chamber 76, agitator 84 maintains it well stirred so that a representative sample is obtained and the excess flow is discharged through overflow outlets 77 into sample collecting funnel 46 and out through line 28. Preferably line 28 returns the sample material to the process flow system.

Assuming that timer motor 36 is running, switches 39 and 40 are in the position illustrated in FIGURE 2, solenoid valves 59 and 68 are closed, and solenoid valve 41 is de-energized, removing air pressure from diaphragm actuator 42, spring 87 moves lever 86 to position inlet 43 to direct the sample stream into sample pot 76 to purge out a previous sample. Light source 92 directs light through collimating lens 93, quartz rod 87, off surface 89 to surface 90, and through quartz rod 88 to photocell 94. This photocell detects the light and photocell relay 49 maintains contacts 51 open so that power relay 52 is de-energized and contacts 53 are open. The position of switch 39, although open in relation to the circuit to solenoid valve 41, is closed with respect to timer motor 36 and solenoid valve 59.

When cam 37 has turned far enough to reach the notch on cam 37, the position of switch 39 is moved to de-energize timer motor 36 and energize solenoid valve 41. Air flows to diaphragm actuator 42, and inlet 43 is moved to direct the sample stream outside chamber 76 to discharge directly into sample-collecting funnel 46. At the same time solenoid valve 59 is open. Relay 72 is energized and sounds alarm 71 after a predetermined time, relay 72 having a time delay coil.

The sample within chamber 76 starts to cool, being maintained at the same temperature throughout by agitator 84, heat being transferred to coolant chamber 78. The temperature of the coolant stream determines the rate at which the cooling takes place. As the solution cools, the temperature is detected by thermistor 61, which is in one leg of a D.C. resistance bridge 62. Bridge 62 is fed with a D.C. voltage, and the output of the bridge, in millivolts, is transmitted to transducer 63 which provides an air signal proportional to the temperature of the solution. This pressure is fed to volume chamber 64.

When the solution cools to the fudge point, the photocell detects the decrease in light, the fudge point also being a cloud point, allowing the contacts 51 in relay 49 to close and energize power relay 52 to close its contacts 53.

Power relay 52 is provided because photocell relay 49 is adapted to handle relatively low current and power relay 52 is large enough to handle the load of the various components in the circuit. Timer motor 36 starts to turn and almost immediately switch 39 is moved to the position illustrated in the drawing, thus de-energizing solenoid valve 41, permitting sample inlet 43 again to be positioned over sample pot 44 to begin purging the previously collected sample. Valve 59 closes, thus trapping in volume chamber 64 a pressure corresponding to the temperature at which the fudge point occurred. A short time later, cam 38 closes switch 40, thus energizing solenoid valve 68 permitting the pressure in chamber 64 to be sensed by pressure recorder-controller 66. A relatively short time later, switch 40 is again open, closing valve 68 and trapping the pressure corresponding with the previously measured fudge point in the line 67 so that controller 66 is exposed to a constant pressure. The system now is in the condition illustrated in the drawing, the initial condition at the beginning of this description, ready for an additional cycle of operation as described.

Time delay relay 72 and alarm 71 provide means for detecting several types of failure in the system. If the light source 92 or photocell 94 fails, power to the time delay relay 72 is not shut off after a predetermined length of time and its contacts will close, energizing the alarm. The delay is a resetting type; after the power has been shut off it resets itself.

Power relay 52 normally is energized only a relatively short length of time, until the opaque solution in the sample pot has been purged. Switch 39 is provided in parallel to provide for a continuation of power to timer motor 36 and valve 59 when contacts 53 are open.

Controller recorder 66 is exposed only to a temperature at which a fudge point took place, thus providing continuous control for the previously measured fudge point, corresponding with the concentration of solution. Timer motor 36, in a preferred embodiment, rotates at about 30 seconds per revolution. Thus, the total duration between samples is 30 seconds plus the cooling time.

Since the moisture content of the solution is determined by the pressure maintained in the concentrator, by using the signal from controller 66 to control the flow of air through motor valve 32 to condenser 24, the pressure in the concentrator is regulated to control the moisture content of the solution, that is to control the concentration.

FIGURE 6 illustrates the variation in light transmission at the fudge point of ammonium nitrate solutions of various concentrations. It will be observed that the light transmission decreases rapidly at temperatures which are characteristic of the concentrations of the solutions.

Throughout the disclosure of the apparatus of our invention, the drawings and description have been simplified by omitting details of structure such as mounting brackets and means for assembly and disassembly, and various items of equipment useful in a complete operable plant, such as extra valves, pumps, and additional controls, have been omitted to permit the invention to be set forth clearly, not obscured by unnecessary complexity.

Reasonable variation and modification are possible within the scope of our invention which sets forth method and apparatus for preserving an intermittently measured quantity, and for measuring and controlling temperature, cloud point, fudge point and concentration.

We claim:
1. In a method for controlling the concentration of a solution which comprises continuously introducing a solution into an evaporation zone, regulating the heat supplied to said evaporation zone to provide a substantially constant temperature therein, continuously withdrawing a concentrated solution from said evaporation zone, producing an output impulse representative of the concentration of said concentrated solution, and automatically controlling the absolute pressure in said evaporation zone in response to variations in said output impulse to maintain said output impulse at a predetermined value and produce a solution of a predetermined concentration, the improvement which comprises,
  producing said output impulse representative of the concentration of said concentrated solution by:
  catching a sample of said concentrated solution;
  measuring the temperature of said sample while cooling said sample and producing a pneumatic signal having a pressure which is a function of said temperature;
  applying said pneumatic signal to a volume chamber to bring the pressure in said chamber to the value of the pressure of said pneumatic signal;
  passing a beam of light through said sample;
  producing an electrical signal which is a function of the light transmission of said sample; and
  discontinuing the application of said pneumatic signal to said chamber, applying the pressure of said chamber to pressure-detecting means to produce said output impulse, and dumping said sample, responsive to a value of said electrical signal representative of cloud point.

2. Means for determining the temperature of a cloud point of a composition, comprising:
  means for catching a sample of said composition;
  means for cooling said sample;
  means for measuring the temperature of said sample as said sample cools and producing a pneumatic signal which is a function of said temperature;
  a volume chamber;
  a first conduit to connect said chamber with said means for producing a pneumatic signal, to apply said pneumatic signal to said chamber to bring the pressure of the volume of said chamber to the pressure of said pneumatic signal;
  a first valve in said first conduit;
  pressure-detecting means;
  a second conduit to connect said chamber with said pressure-detecting means to apply said pressure to said detecting means;
  a second valve in said second conduit;
  means for passing a beam of light through said sample;
  means for producing an electrical signal which is a function of the light transmission of said sample; and
  means to close said first valve, open said second valve, and dump said sample, responsive to a value of said electrical signal representative of said cloud point.

3. Means for determining the temperature of a cloud point of a composition, comprising:
  means for catching a sample of said composition;
  means for cooling said sample;
  means for measuring the temperature of said sample as said sample cools and producing a pneumatic signal which is a function of said temperature;
  a volume chamber;
  a first conduit to connect said chamber with said means for producing a pneumatic signal, to apply said pneumatic signal to said chamber to bring the pressure of the volume of said chamber to the pressure of said pneumatic signal;
  a first valve in said first conduit;
  pressure detecting means;
  a second conduit to connect said chamber with said pressure-detecting means to apply said pressure to said detecting means;
  a second valve in said second conduit;
  means for passing a beam of light through said sample;
  means for producing an electrical signal which is a function of the light transmission of said sample;
  means to close said first valve, open said second valve and dump said sample, responsive to a value of said electrical signal representative of said cloud point; and
  means to open said first valve, close said second valve and catch a new sample following a predetermined time interval.

4. In a method for controlling the concentration of a solution which comprises continuously introducing a solution into an evaporation zone, continuously withdrawing a concentrated solution from said evaporation zone, producing an output impulse representative of the concentration of said concentrated solution, and automatically controlling in response to variations in said output impulse, a variable responsive to the fudge point of said solution, to maintain said output impulse at a predetermined value and produce a solution of a predetermined concentration, the improvement which comprises, producing said output impulse representative of the concentration of said concentrated solution by:

catching a sample of said concentrated solution;

measuring the temperature of said sample while cooling said sample and producing a pneumatic signal having a pressure which is a function of said temperature;

applying said pneumatic signal to a volume chamber to bring the pressure in said chamber to the value of the pressure of said pneumatic signal;

passing a beam of light through said sample;

producing an electrical signal which is a function of the light transmission of said sample; and discontinuing the application of said pneumatic signal to said chamber, applying the pressure of said chamber to pressure-detecting means to produce said output impulse, and dumping said sample, responsive to a value of said electrical signal representative of cloud point.

References Cited by the Examiner

UNITED STATES PATENTS 2,684,008   7/54   Vonnegut _____ 88—14
2,892,378   6/59   Canada _____ 88—14

RICHARD C. QUEISSER, *Primary Examiner.*

JOSEPH P. STRIZAK, *Examiner.*